United States Patent [19]

Nakanishi et al.

[11] Patent Number: 4,695,976

[45] Date of Patent: Sep. 22, 1987

[54] COMBINED ELECTRONIC TABLE PREPARATION AND GRAPH DRAWING APPARATUS

[75] Inventors: Yasuhiro Nakanishi, Nara; Shoichi Kawai, Osaka, both of Japan

[73] Assignee: Sharp Kabushiki Kaisha, Osaka, Japan

[21] Appl. No.: 530,071

[22] Filed: Sep. 7, 1983

[30] Foreign Application Priority Data

Sep. 8, 1982 [JP] Japan .............................. 57-157326

[51] Int. Cl.⁴ .......................... G06F 3/02; G06F 3/14; G06F 7/00
[52] U.S. Cl. ................................... 364/900; 364/709; 364/710; 364/520; 340/753
[58] Field of Search ............... 400/18, 65; 340/721, 340/722, 745, 747, 753; 364/708, 709, 710, 900 MS File, 520

[56] References Cited

U.S. PATENT DOCUMENTS

| | | | |
|---|---|---|---|
| 3,872,959 | 3/1975 | Wang et al. | 400/65 |
| 4,038,535 | 7/1977 | Aldridge et al. | 364/900 X |
| 4,101,962 | 7/1978 | Hakata | 364/710 X |
| 4,344,147 | 8/1982 | Sado et al. | 364/710 |
| 4,367,535 | 1/1983 | Matsuyama | 364/768 |
| 4,447,889 | 5/1984 | Haneda | 364/900 |
| 4,498,144 | 2/1985 | Haneda | 364/900 |
| 4,535,416 | 8/1985 | Kano et al. | 364/710 X |
| 4,608,557 | 8/1986 | Nakamishi et al. | 340/753 X |
| 4,609,918 | 9/1986 | Nakanishi et al. | 340/753 |

OTHER PUBLICATIONS

*Four New Products from Radio Shack*, PC-2 Pocket Computer, Byte Publication, Mar. 1982, pp. 40-41.

*Primary Examiner*—Raulfe B. Zache
*Assistant Examiner*—Thomas C. Lee
*Attorney, Agent, or Firm*—Birch, Stewart, Kolasch & Birch

[57] ABSTRACT

An integrated electronic device has table preparation and graph drawing capabilities. A memory receives numerical input data which is arranged in tabular rows and columns. The device sums the data in column or row sums and stores the sums. A graph drawing device is responsive to the data stored in memory and controls a printer to draw a graph based on the row or column sums. The graph drawing device may draw one of a plurality of different graph types selected by the user. The column sum or row sum information may thus be displayed in one of the plurality of graph types.

1 Claim, 6 Drawing Figures

COMBINED ELECTRONIC TABLE PREPARATION AND GRAPH DRAWING APPARATUS

BACKGROUND OF THE INVENTION

The present invention relates to a combined table preparation and graph drawing apparatus and, more particularly, to a combined electronic table preparation and graph drawing apparatus for tabling input data and drawing a graph based on the tabled data.

Conventionally, graph drawing devices solely for drawing graphs and table preparation apparatuses solely for preparing tables have been individually proposed, but, no intelligent devices combining these two features have been proposed.

Therefore, to prepare a table with numerical data and to prepare a graph based on a group of vertically tabled and/or horizontally tabled data, the process is broken into two steps. The conventional table preparation apparatus is first operated to prepare a table from numerical data. Secondly, the conventional graph drawing apparatus is operated to draw a graph based on a group of vertically or horizontally tabled data.

Thus, at least two individual devices were required, one to carry out each step of the process.

SUMMARY OF THE INVENTION

Accordingly, it is an object of the present invention to provide a novel combined table preparation and graph drawing aapparatus for speedily drawing a table and a graph.

It is another object of the present invention to provide a novel combined electronic table preparation and graph drawing apparatus for tabling data and drawing a graph based on vertically tabled data sums and/or horizontally tabled data sums.

It is a further object of the present invention to provide a novel combined electronic table preparation and graph drawing apparatus for tabling data and for drawing a graph based on vertically tabled data sums and/or horizontally tabled data sums where the sums are derived by automatically summing the data items of the table.

Briefly described, in accordance with the present invention, a combined electronic table preparation and graph drawing apparatus comprises an input device for inputting numerical data, a table preparation circuit responsive to the input device for tabling the input numerical data, a memory responsive to the table preparation circuit for summing vertically tabled data and/or horizontally tabled data and for storing the sums, and a graph drawing circuit responsive to the memory for drawing a graph based on the sums stored in the memory.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
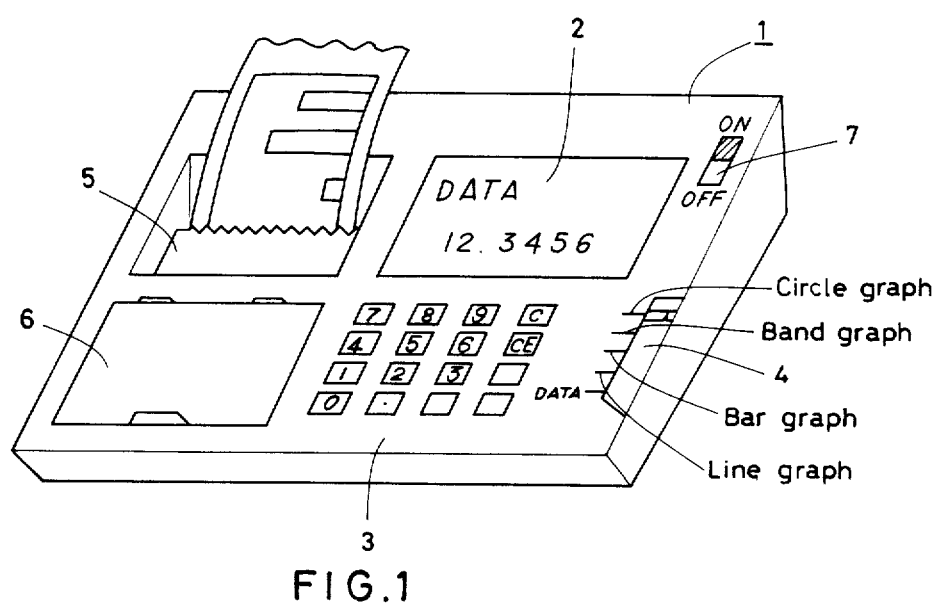
FIG. 1 shows a perspective view of a combined electronic table preparation and graph drawing apparatus according to the present invention.

FIG. 1 shows a perspective view of a combined electronic table preparation and graph drawing appatratus of the present invention. The combined apparatus comprises a main body 1 of a rectangular cubic box-like configuration, a display 2 provided on the main body 1, a keyboard 3 for effecting control through the input of various data for preparation of required graphs, a switch 4 (for example, in the form of a slide switch) for selecting a table preparation mode or a graph drawing mode and for designating types or kinds of graphs including a circle graph, a band graph, a bar graph, and a line graph in the graph drawing mode, a printer 5 for preparing graphs according to the present invention, a print paper storing section 6 for accommodating therein print paper such as a roll paper or the like, and a power switch 7, all of which are laid out on the front face of the main body 1 side by side as illustrated.

The switch 4 is placed at the "DATA" position to select the table preparation mode. It is placed at anyone of the four graph positions to select the graph drawing mode.

The keyboard 3 further includes, for example, ten-keys actuated for inputting data including scale information, a decimal point key, a clear key (C) for erasing the data, a clear/entry key (CE) actuated for clearing-/entering the data, an "ENTER" key actuated for causing registers R1-R9 of the RAM 13 to store the key input information, and a "DP"0 key actuated for calculating and printing out the right side sums.

Figure 2:
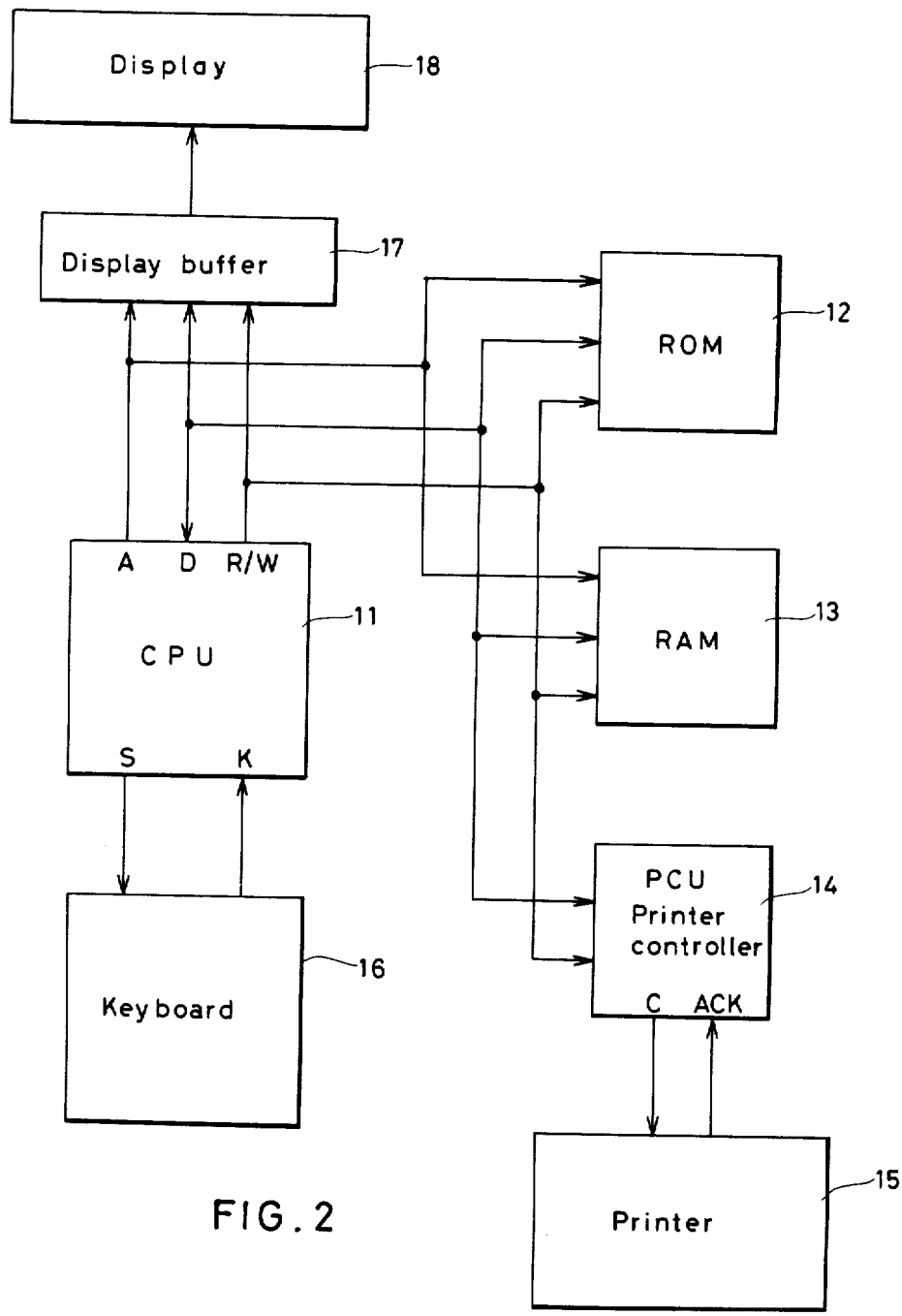
FIG. 2 shows a block diagram of the combined electronic table preparation and graph drawing apparatus of FIG. 1.

FIG. 2 shows a block diagram of a circuit implemented within the combined table preparation and graph drawing apparatus of FIG. 1.

The circuit of FIG. 2 comprises a CPU 11, a ROM 12, a RAM 13, a printer controller (PCU) 14, a printer 15, a keyboard 16, a display buffer 17, and a display 18.

The keyboard 16 of FIG. 2 is related to the element 3 of FIG. 1. The display 18 of FIG. 2 is related to the element 2 of FIG. 1.

According to a program as stored within the ROM 12, the CPU 11 reads in key input information from the keyboard 16. The CPU 11 serves to transfer the contents of the RAM 13 toward the display buffer 17, so that the display 18 displays the information. The CPU 11 further serves to transfer the contents of the RAM 13 toward the PCU 14, so that the printer 15 prints out the information.

The ROM 12 stores the programs that perform the reading of the key input information frame the keyboard 16, the displaying on the display 18, and the printing on the printer 15. Further, the ROM 12 stores a program for causing the CPU 11 to operate according to numerical information and formula information that is stored within the RAM 13.

The RAM 13 comprises registers for storing the key input information including numerical data, character data, and formula data inputted with the keyboard 16, and the operation results such as A, B, C, etc. The RAM 13 further comprises flags and counters to be used for the operation of the CPU 11.

The PCU 14 is responsive to the numerical data and the character data from the CPU 11 for generating specific patterns for the numberical data and the character data. The PCU 14 is further responsive to print control commands from the CPU 11 for decoding the print control commands such as the upward/downward movement and the line movement of a print pen. The printer 15 is responsive to the output of the PCU 14 for printing out the numerical data and the character data, and for moving the pen upward, downward etc.

The keyboard 16 contains numeral ten-keys, A-Z alphabet keys, function keys, and the switch 4. The type of some key input information can be detected by using key strobe signals outputted by the CPU 11 and common signals entered into the CPU 11.

The display buffer 17 is responsive to the numerical data and the character data transferred from the CPU 11 for forming display information suitable for the display 18, so that the display 18 displays the information.

Figures 3, 4:
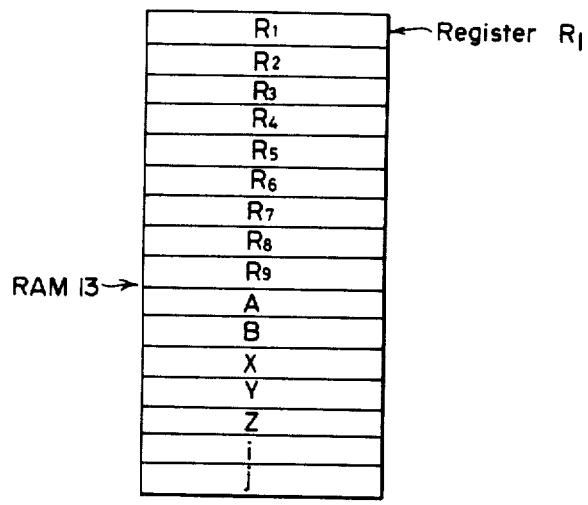
FIG. 3 shows the configuration of a data storing memory, the RAM of FIG. 2, used for the present invention.
FIG. 4 shows an example of a table illustrating the accumulation of data in memory in accordance with the present invention.

FIG. 3 shows the memory configuration of the RAM 13 of FIG. 2 illustrating its arrangement of atorage registers.

The RAM 13 comprises registers R1-R9 for the graph drawing for storing either the key input information or horizontal sums RT1-RT9. Each of the horizontal sums RT1-RT9 is the total of the horizontally (row) tabled data in the table of FIG. 4. The RAM 13 comprises the "A" register for summing the vertically (column) tabled data at a single column. The "A" register stores vertical sums CT1-CT5 each of which is the total of the vertically tabled data at the single column in the table of FIG. 4. Further, the RAM 13 may comprise a register for storing the entire total TTL of the tabled data in the table of FIG. 4.

In FIG. 4, "a" indicates a frame for covering a single row of items, and "b" indicates a column of printed results in response to the actuation of a "DP" key as will be described below.

Figure 5A:
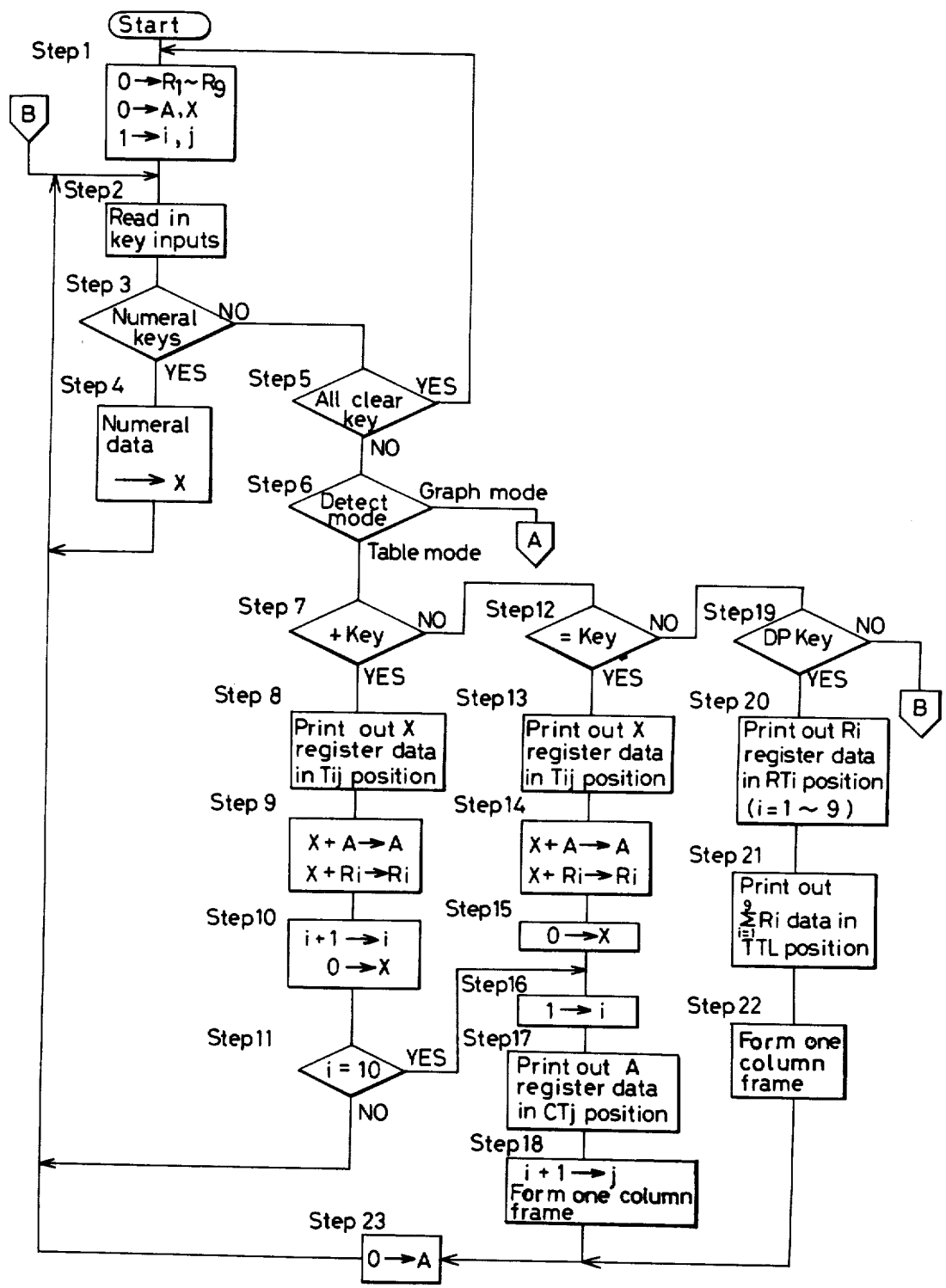
FIGS. 5(A) and 5(B) show flow charts of the operation of the present invention.
Figure 5B:
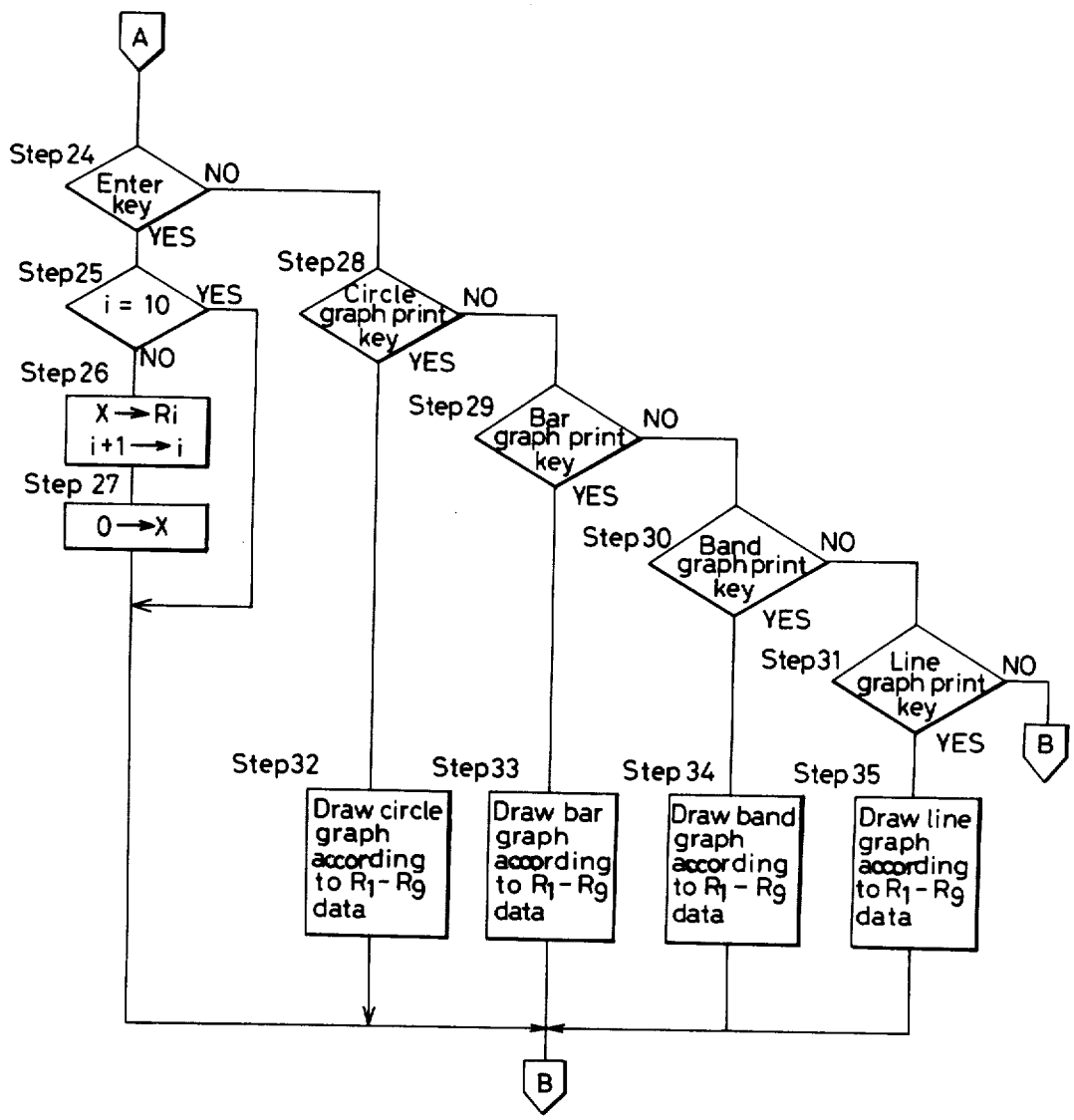

FIGS. 5(A) and 5(B) show flow charts of the table preparation steps and graph drawing steps of the present invention, respectively.

With reference to FIG. 5(A), the following steps are conducted:

Step 1: The registers of the RAM are initialized.

Step 2: This step is executed to read in key input information.

Step 3: This step is executed to detect whether a numerical key is actuated or not.

Step 4: When some numerical key information is inputted, the key input information is entered into the X register. When keys "1", "2", and "3" are subsequently actuated, the X register receives and stores the information in the form of "123".

Step 5: This step is executed to detect whether the clear key "C" is actuated for clearing all the information or not.

Step 6: This step is executed to detect whether either the table preparation mode or the graph drawing mode is selected by the switch 4.

Steps 7-11: These steps are executed to process the plus key (+) input operation in the table preparation mode.

Step 7: It is detected whether the plus key (+) is actuated or not.

Step 8: The contents of the X register are printed out at the Tij position of the table of FIG. 4. At the first actuation of the plus key, they are printed out at the T11 position.

Step 9: The "A" register is operated to sum the vertically tabled data at the single column. The Ri(i=1-9) registers are operated to sum the horizontally tabled data.

Steps 10 and 11: These steps are executed to detect whether the plus key is actuated some specific number of times, for example, nine to close the table column.

Thus, the plus key is repetitively actuated to table the respective input data items.

Step 12: This step is executed to detect whether the equal key (=) is actuated also to close the table column.

Step 13: The contents of the X register are printed out at the Tij position.

Step 14: The A register and the X register are operated to sum the vertically tabled data at the single column and the horizontally tabled data, respectively.

Step 17: The contents of the "A" register are printed out at the CTj(j=1-5) position as being the vertically tabled data sums.

Step 18: The horizontally tabled data sums are completed by changing the value of "j". Thus, the respective table items of the one-column frame are completed and printed out. The one-column frames are printed out.

Step 23: This step is executed to clear the A register for summing the vertically tabled data.

Step 19: This step is executed to detect whether the "DP" key is actuated for calculating and printing out the right side sums.

Step 20: The contents of the Ri(i=1-9) register are printed out at the RTi(i=1-9) positions.

Step 21: The sums of the registers Ri(i=1-9) are calculated and printed out at the entire total position, namely, the TTL position.

Step 22: The one-column frame is formed.

Thus, in the table preparation mode, the numeral ten-keys are actauated to input some items of the key information, so that the plus key, the equal key, and the "DP" key are actuated to table the key input information in which the vertically and/or the horizontally tabled data are summed. The R1-R9 registers are provided for storing the horizontally tabled data sums as printed out at the RT1-RT9 positions.

FIG. 5(B) shows a flow chart of the graph drawing steps according to the present invention. This flow chart is selected when the graph drawing mode is selected at the step 6 of the flow chart of FIG. 5(A).

With reference to FIG. 5(B), the following steps are conducted:

Steps 24-27: These steps are executed to process the case of actuating the "ENTER" key. Each time the "ENTER" key is actuated, the key input information in the X register is entered into each of the registers R1-R9 of the RAM 13 in the case where the registers R1-R9 store no information.

Steps 28-35: Since the R1-R9 registers store the sums RT1-RT9 of the horizontally tabled data in this case, the data of the registers R1-R9 are used to draw a graph in response to the actuation of a graph execution key. The graph execution key is one of a circle graph print key, a bar graph print key, a band graph print key, and a line graph print key. Since the graph drawing steps are conventional and are not directed to the gist of the present invention, no detailed description is explained.

The horozontally tabled data sums of the R1–R9 registers are used to draw the graph. An additional group of registers related to the "A" register may be provided for storing the vertically tabled data sums and drawing the graph with these sums.

In the case where it is desired that a group of data different from the tabled data be used to draw a graph, the graph drawing mode is selected, in which steps 24–27 are executed to cause the R1–R9 registers to store the respective data by subsequently actuating the "ENTER" key.

According to the present invention, based on the input data, any table can be formed. The vertically and the horizontally tabled data can be individually summed, automatically. A graph drawing selection key is actuated to draw any graph based on the summed data. The data storage memory for storing the data for the graph can serve to store the vertically or the horiozontally tabled data sums. The number of the memory means can be reduced.

In the above described preferred embodiment of the present invention, the four kinds of graphs are selected although not limited to these types.

While only certain embodiments of the present invention have been described, it will be apparent to those skilled in the art that various changes and modifications may be made therein without departing from the spirit and scope the present invention as claimed.

What is claimed is:

1. An integrated electronic device having table preparation and graph drawing capabilities comprising:
   input means for inputting elements of numerical data into the apparatus:
   table preparation means, responsive to an operation of said input means, for tabling the input elements of numerical data into data columns and data rows, each element of numerical data being in a said data column and a said data row, said table preparation means including switch means for controlling start, advance and end of tabling of the numerical data;
   means, responsive to an operation of said table preparation means, for summing said elements of numerical data in each said data column or each said data row to form column sums or row sums, respectively, and for storing said column sums or row sums, said means for summing and storing being also directly responsive to said input means for storing numerical data introduced thereby;
   graph drawing means, responsive to an operation of said means for summing and storing, for drawing a graph from a plurality of different graph types based on said column sums or said row sums stored therein; and
   mode selection means for selecting a table preparation mode and a graph drawing mode, said mode selection means selecting the table preparation mode to activate the table preparation means and selecting the graph drawing mode to actuate the graph drawing means, said mode selection means further selecting, when said graph drawing mode is selected, the type of graph to be drawn by said graph drawing means.

* * * * *